May 31, 1960     J. R. CARSWELL     2,938,996
DUAL PISTON WELDING GUN
Filed June 26, 1957     2 Sheets-Sheet 1
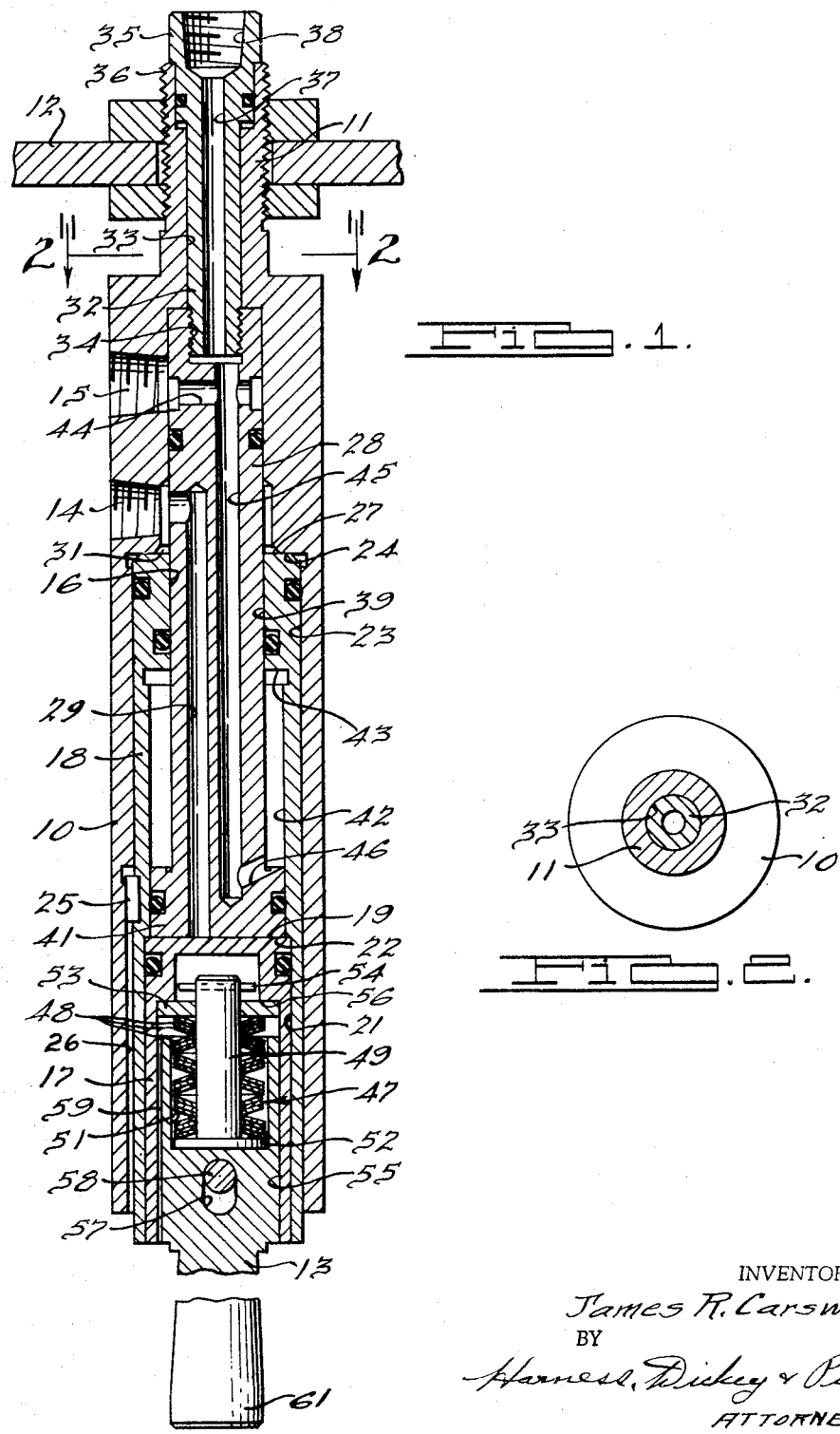
INVENTOR.
James R. Carswell,
BY
Harness, Dickey & Pierce
ATTORNEYS.

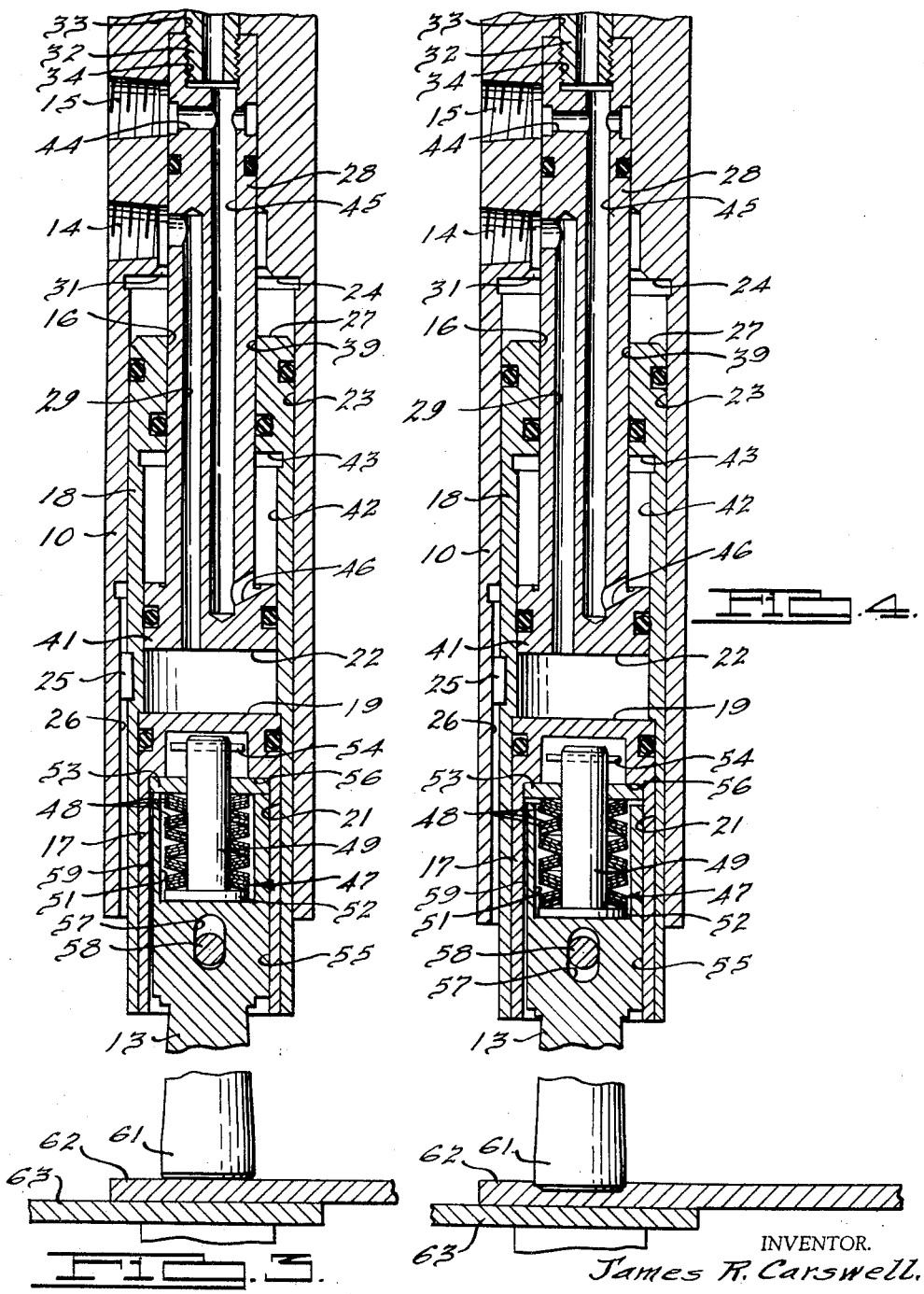

United States Patent Office 2,938,996
Patented May 31, 1960

2,938,996
DUAL PISTON WELDING GUN

James R. Carswell, Huntington Woods, Mich., assignor to Delta Welder Corporation, Detroit, Mich., a corporation of Michigan Filed June 26, 1957, Ser. No. 668,088

3 Claims. (Cl. 219—89)

This invention relates to welding machines, and more particularly to dual piston welding guns adapted for use either singly or in groups as production spot welding assemblies.

It is an object of the present invention to provide a novel and improved dual piston welding gun for resistance spot or projection welding, which includes improved means for maintaining proper engagement between the electrode and work so as to prevent the possibility of defective welds due to insufficient pressure as the work becomes heated.

It is another object to provide an improved welding gun of this nature which utilizies a novel type of spring take-up for maintaining proper electrode engagement, the novel construction insuring instantaneous response to changes in the plasticity of the work.

It is a further object to provide an improved dual piston welding gun having the above characteristics, and which includes a novel auxiliary port arrangement which greatly contributes to the versatility of the mechanism as well as reducing the cost of manufacture.

It is another object to provide an improved hydraulic dual piston welding gun capable of exerting a relatively high force on the electrode, so that a gun of moderate size may be utilized for heavier gauges of steel while still maintaining the electrode forces at a proper level.

Other objects, features and advantages of the present invention will become apparent from the subsequent description, taken in conjunction with the accompanying drawings.

In the drawings:

Figure 1 is a cross-sectional view in elevation of the improved welding gun, showing the parts in their retracted position;

Figure 2 is a plan cross-sectional view of the mechanism shown in Figure 1, taken along the line 2—2 of Figure 1;

Figure 3 is a view similar to Figure 1 but with the parts in their projected position and with the spring collapsed; and Figure 4 is a view similar to Figure 3 but showing the spring in its expanded position.

In general terms, the invention comprises a hydraulic dual piston welding gun having a cylinder provided with advancing and retracting ports. An electrode actuator is carried at one end of this cylinder, and projects therefrom. Piston means are connected to this actuator and serve to extend the actuator from the cylinder when fluid pressure is applied to the advancing port. A novel compression spring take-up construction is provided between the advancing piston means and the electrode actuator, the construction being such that when the electrode engages the work in the initial phase of the operation, the spring will be collapsed. The construction and location of the spring is such that when the work becomes plastic due to its higher temperature, the spring will instantaneously react to move the actuator and electrode toward the work, thus maintaining a constant pressure and prevent "blowout" or other welding defects which might otherwise occur if the interface resistance were to be raised by reduction of pressure. The rapid reaction of the spring stems from the fact that it need only move a minimum amount of mass, since the spring is connected directly to the electrode actuator instead of to the advancing piston.

Another feature of the invention is the provision of a member mounted in the end of the cylinder opposite that from which the electrode actuator projects, this member serving the dual function of an auxiliary retracting port as well as a retainer for inner portions of the mechanism. Still another novel feature resides in the fact that the advancing piston means includes dual piston faces, these parts cooperating with the remaining elements of the assembly to greatly increase the available electrode forces for a given gun diameter and fluid pressure in the supply line.

Referring more particularly to the drawings, the welding gun comprises a cylinder 10 having a mounting post 11 adapted to be mounted on a support shown partially at 12 in any desired position, the gun being shown in a vertical position in the figures. Projecting from the open lower end of cylinder 10 is an electrode actuator 13 which is adapted to actuate an electrode 61 in either direction, this electrode being of the type used in resistance spot or projection welding of metal parts. An advancing port 14 and a retracting port 15 are provided in the upper portion of cylinder 11, these ports leading from the outer surface of the cylinder to a relatively small diameter bore 16.

The advancing piston means for electrode actuator 13 comprises a piston insert 17 fixed within a piston 18, the piston and insert being secured to each other and acting in unison. In particular, piston insert 17 has a piston face 19 and is fixed within a bore 21 of piston 18, the outer edge of piston face 19 engaging a shoulder 22 at an intermediate portion of bore 21. Piston 18 is slidably mounted in a bore 23 of cylinder 10 which is larger than bore 16, piston 18 when in its retracted position engaging a shoulder 24 between the two bores of cylinder 10. A key 25 carried by piston 18 rides in a keyway 26 within cylinder 10, thus preventing relative rotation between pistons 17 and 18 and cylinder 10.

Piston face 27 of piston 18 is connected to advancing port 14, this advancing port also being connected to piston face 19 of piston insert 17. In particular, a piston retainer 28 is disposed within cylinder 10 and is provided with a passageway 29 leading from port 14 to piston face 19, while the fluid connection between port 14 and piston face 27 comprises a relieved portion 31 adjacent shoulder 24 of cylinder 10 which permits fluid to flow directly to the chamber formed by bore 23. Piston retainer 28 fits within bore 16 a cylinder 10, being secured to the upper end of cylinder 11 by an adapter 32. This adapter extends through a bore 33 in mounting post 11, the inner end of the adapter being threaded into a recess 34 at the upper end of retainer 28, thus securing the retainer to the upper end of the cylinder. The upper end 35 of adapter 32 is provided with a shoulder 36 engaging the top of post 11. Adapter 32 is also provided with an axial passageway 37 leading from a port 38 in the upper end of the adapter to recess 34 in piston retainer 28, the purpose of this construction being described in detail below.

Piston retainer 28 extends through a bore 39 in the upper end of piston 18 and has an enlarged lower head 41 which is slidable within a bore 42 in piston 18. The annular surface 43 between bores 39 and 42 of piston 18 serves as a retracting piston face. This piston face is connected to retracting port 15 by means of a radial passageway 44, an axial passageway 45, and an angular passageway 46 in piston retainer 28. Axial passageway 45 is also connected with recess 34, and it will therefore be seen that port 38 may act as an auxiliary retracting port in cases where retracting port 15 is inaccessible.

With the parts thus far described, it will be evident that when fluid pressure is applied to advancing port 14, piston 18 and piston insert 17 will move in unison from a retracted position as shown in Figure 1 to an extended position as shown in Figures 2 and 3. When the pressure at port 14 is relieved and fluid pressure is applied to either port 15 or port 38, piston insert 17 and piston 18 will be retracted in unison to the position shown in Figure 1. The drawings illustrate conventional sealing members which may be provided where appropriate to prevent leakage of the pressure fluid during this operation.

The novel means for providing a spring take-up action on electrode actuator 13 comprises spring means generally indicated at 47 which are disposed between piston insert 17 and actuator 13. In the illustrated embodiment, spring means 47 is composed of a plurality of stacked cone-shaped disk springs 48 carried by a retaining pin 49 within a bore 51 at the inner end of actuator 13. It will be understood however that other types of springs could be utilized within the principles of the invention. Spring means 47, which will hereafter be referred to as a spring, engages at its lower end a head 52 on pin 49, and the spring is retained in position by a washer 53 held on the upper end of pin 49 by a cotter pin 54. The assembly comprising actuator 13, spring 47, pin 49 and washer 53 is slidably disposed within a bore 55 in piston insert 17, washer 53 engaging a shoulder 56 near the inner end of bore 55. Actuator 13 is provided with an elongated slot 57, and a pin 58 extends through this slot and is fixed to piston insert 17. It will be seen that with spring 47 in its expanded condition, as shown in Figure 1, pin 58 will engage the upper end of slot 57, while compression of spring 47 will cause pin 58 to move downwardly in the slot. Sufficient space is provided between the upper end of point actuator 13 and washer 53 to permit this movement, and bore 55 in piston insert 17 is likewise made sufficiently long to accommodate the movement of pin 49. One side 59 of actuator 13 is preferably flattened to permit free flow of air to and from the chamber formed by bores 51 and 55, thereby preventing retardation of movement which might occur if air were entrapped.

*Operation*

Assuming an initial condition in which the parts are in the position shown in Figure 1, with fluid lines connected to ports 14 and 15, application of fluid pressure to port 14 will cause fluid to flow through annular space 31 to piston face 24 and through passageway 29 to piston face 19. Assuming that port 15 is connected to tank, piston 18 and piston insert 17 will move downwardly in unison. Shoulder 56 of piston insert 17 will engage washer 53, the washer in turn engaging spring 47 which will transmit the force to actuator 13 through head 52 of pin 49. The actuator will thus move downwardly simultaneously with piston 18, spring 47 remaining uncompressed until electrode 61 engages the work comprising overlapping plates 62 and 63. Continued application of fluid pressure will cause further downward movement of piston 18 and piston insert 17, thus compressing spring 47 as shown in Figure 3. During this movement pin 58 will move downwardly in slot 57. It should be noted that a relatively large area of the working parts of the device will be subjected to pressure from port 14, namely, piston faces 19 and 27. Thus, in a relatively small diameter assembly a substantially higher total force can be achieved than would be the case with a conventional single piston face.

Current will then be applied to the circuit, and due to the high initial interface resistance between electrode 61 and plate 62, the latter is heated and will tend to become plastic, yielding to pressure exerted upon it by the electrode. As the metal under the electrode flows outwardly, spring 47 will expand as shown in Figure 4, moving actuator 13 and electrode 61 continually into contact with the metal. In this manner a substantially constant pressure will be exerted on the portion of the metal subject to the spot weld, preventing "blowout" which might take place if the interface resistance were increased by a reduction in pressure. It should be noted that the only part of the mechanism which will be moved by the expansion of spring 47 is actuator 13 and the attached electrode 61. The weight and inertia of these parts is relatively small compared with that of piston 18 and piston insert 17, which are also subject to static frictional resistance due to their seals. The reaction of the spring to the plasticizing of the metal will therefore be extremely rapid, and with the breakdown of interface resistance between electrode 61 and plate 62, the resistance between plates 62 and 63 will become the primary resistance in the circuit. It should also be observed that due to the nature of conical disk springs 48 which comprise spring 47, a relatively high compressive force can be obtained within a short compression distance, this distance being sufficient to compensate for the metal flow as it is heated. As spring 47 expands slot 57 will move downwardly until pin 58 is disposed in the upper portion of the slot.

It has been found that the strength of spring 47 is critical in obtaining maximum efficiency of the unit. More particularly, the spring rate must be such that there is substantial collapsing of the spring when full pressure is applied to port 14, but the spring must not be so weak that it will collapse after only a partial pressure has been applied. If the spring is too stiff, it will not be collapsed enough to take up the required amount when plate 62 becomes plastic, while a weak spring will not expand until the pressure has been reduced too great an amount after softening of the work has been initiated. Since the available line pressures may vary in different industrial establishments, care must be taken in the selection of spring 48 so that there will not be too little spring resistance at higher line pressures or too much stiffness if lower pressures are used.

When it is desired to retract electrode 61, port 14 will be connected to tank and port 15 pressurized. Fluid will thereupon flow through passageways 44, 45 and 46 into the chamber formed by bore 42 of piston 18, creating pressure on face 43 of this piston to retract piston 18 together with piston insert 17. Since pin 58 engages the top of slot 57, this movement will result in simultaneous retraction of actuator 13 and electrode 61.

Should the mounted position of the welding gun be such that it is impractical to connect fluid conduits to both ports 14 and 15, port 38 may be utilized in place of port 15. In this case retraction of the welding gun will be carried out by flow of fluid to passageway 37 and into passageway 45.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a hydraulic welding gun, a cylinder, a piston having opposed faces and slidable within said cylinder between a retracted position and an extended position, an extending port in said cylinder connected to one face of said piston, a retracting port in said cylinder connected to the opposite face of said piston, a tubular portion in said piston, a piston insert fixed within said piston tubular portion, said piston insert having a piston face with the same orientation as said one piston face, means connecting said extending port to said piston insert face when the piston is in its retracted position whereby forces on said one piston face and on said piston insert face will act in unison to extend said piston, a bore within said piston insert, an electrode actuator disposed within said bore and extending outwardly therefrom, a pin-and-slot connection between said piston and actuator, and a compression spring disposed between said piston and actuator, said spring being compressible when said piston is moved to its extended position and the work is engaged, the spring being of such size as to cause said actuator to move toward said work after said piston has reached its extended position and the work becomes plastic due to heating.

2. The combination according to claim 1, further provided with a bore within said piston insert, said electrode actuator being disposed within said bore, a bore within said actuator, and a shoulder in said piston insert bore, said spring being disposed within said actuator bore and confined by said shoulder.

3. The combination according to claim 2 further provided with a guide pin disposed within said actuator bore, said spring comprising a stack of cone disk springs on said guide pin.

References Cited in the file of this patent
UNITED STATES PATENTS

| | | |
|---|---|---|
| 556,196 | Molas | Mar. 10, 1896 |
| 1,548,559 | Simpson | Aug. 4, 1925 |
| 2,457,606 | Senn | Dec. 28, 1948 |
| 2,460,759 | Martin et al. | Feb. 1, 1949 |
| 2,714,150 | Kaiser | July 26, 1955 |
| 2,776,362 | Welch | Jan. 1, 1957 |
| 2,810,062 | Kaunitz | Oct. 15, 1957 |
| 2,839,665 | Wolfbauer | June 17, 1958 |